(12) United States Patent
Grieger

(10) Patent No.: US 11,305,678 B2
(45) Date of Patent: Apr. 19, 2022

(54) BELT MOUNT FOR A VEHICLE SEAT OR A VEHICLE BENCH SEAT AND VEHICLE SEAT ARRANGEMENT

(71) Applicant: Aguti Produktentwicklung & Design GmbH, Langenargen (DE)

(72) Inventor: Andreas Grieger, Kressbronn (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 0 days.

(21) Appl. No.: 16/998,131

(22) Filed: Aug. 20, 2020

(65) Prior Publication Data

US 2022/0055511 A1    Feb. 24, 2022

(51) Int. Cl.
*B60N 2/68* (2006.01)

(52) U.S. Cl.
CPC .................... *B60N 2/688* (2013.01)

(58) Field of Classification Search
CPC ........ B60N 2/688; B60N 2/242; B60R 22/26; B60G 22/24
See application file for complete search history.

(56) References Cited

U.S. PATENT DOCUMENTS

| | | | |
|---|---|---|---|
| 2,891,804 A | 6/1959 | Frayne et al. | |
| 4,350,369 A | 9/1982 | Chika | |
| 5,494,316 A * | 2/1996 | Maesing | B60R 22/18 280/808 |
| 5,868,452 A * | 2/1999 | Grieger | B60N 2/4249 296/68.1 |
| 7,040,696 B2 * | 5/2006 | Vits | B60N 2/242 297/216.1 |
| 9,475,413 B2 * | 10/2016 | Hayashi | B60N 2/01 |
| 2011/0260482 A1 * | 10/2011 | Bourgraf | A61G 3/001 296/19 |

(Continued)

FOREIGN PATENT DOCUMENTS

| | | | | |
|---|---|---|---|---|
| DE | 4333463 A1 * | 4/1995 | | B60R 22/18 |
| DE | 60302129 T2 * | 7/2006 | | B60N 2/3045 |

(Continued)

OTHER PUBLICATIONS

German Search Report (Application No. 10 2018 105 919.1) dated Feb. 28, 2019.

(Continued)

*Primary Examiner* — Paul N Dickson
*Assistant Examiner* — Kurtis Nielson
(74) *Attorney, Agent, or Firm* — Burr & Brown, PLLC

(57) ABSTRACT

A belt mount for a vehicle seat or a vehicle bench seat in a vehicle is proposed, wherein the belt mount comprises an attachment mechanism for attaching to a vehicle structure in the region of a vehicle floor such that a lower end section of the belt mount can be fixed in the region of the vehicle floor, wherein the belt mount comprises a support arrangement with a support member for supporting on the vehicle structure of the vehicle. According to the invention, the support member, protruding forward in the driving direction, is present on the belt mount such that it is spaced apart at the top from the lower end section of the belt mount and is formed in such a way that the support member can be connected in the region of the vehicle structure of the vehicle which is present above the vehicle floor.

12 Claims, 1 Drawing Sheet

(56) References Cited

U.S. PATENT DOCUMENTS

| | | | | |
|---|---|---|---|---|
| 2014/0239683 A1* | 8/2014 | Marini | | B60N 2/42709 |
| | | | | 297/216.13 |
| 2015/0048666 A1* | 2/2015 | Gardner | | B60N 2/24 |
| | | | | 297/452.21 |
| 2016/0009200 A1* | 1/2016 | Katoh | | B60N 2/10 |
| | | | | 296/68.1 |
| 2016/0090015 A1 | 3/2016 | Karube et al. | | |
| 2016/0176325 A1* | 6/2016 | Fujita | | B60N 2/4228 |
| | | | | 297/216.17 |
| 2018/0170218 A1* | 6/2018 | Nowland | | B60N 2/01 |
| 2020/0130536 A1* | 4/2020 | Rogg | | B60N 2/01558 |

FOREIGN PATENT DOCUMENTS

| | | | | |
|---|---|---|---|---|
| DE | 10 2014 003 966 A1 | | 9/2015 | |
| DE | 102016205055 A1 * | | 9/2017 | ............. B60N 2/062 |
| DE | 10 2016 117 898 A1 | | 10/2017 | |
| DE | 102017109467 A1 * | | 5/2018 | ........... B60N 2/4221 |
| EP | 1247724 A2 * | | 10/2002 | ........... B62D 21/157 |
| EP | 2208635 A1 * | | 7/2010 | ............. F41H 7/046 |
| EP | 3321126 B1 * | | 9/2019 | ............. B60N 2/688 |
| EP | 3539818 A1 * | | 9/2019 | ............. B60N 2/688 |
| FR | 1461600 A * | | 2/1966 | ............. B60N 2/3011 |
| FR | 2903351 A1 * | | 1/2008 | ............. B60N 2/688 |
| GB | 2287645 A * | | 9/1995 | ............. B60N 2/688 |
| JP | 2010-083375 A1 | | 4/2010 | |
| WO | WO-2012007689 A1 * | | 1/2012 | ............. B60N 2/688 |

OTHER PUBLICATIONS

Extended European Search Report (Application No. 19162611.8) dated Aug. 2, 2019.

European Office Action (Application No. 19 162 611.8) dated Feb. 24, 2021.

* cited by examiner

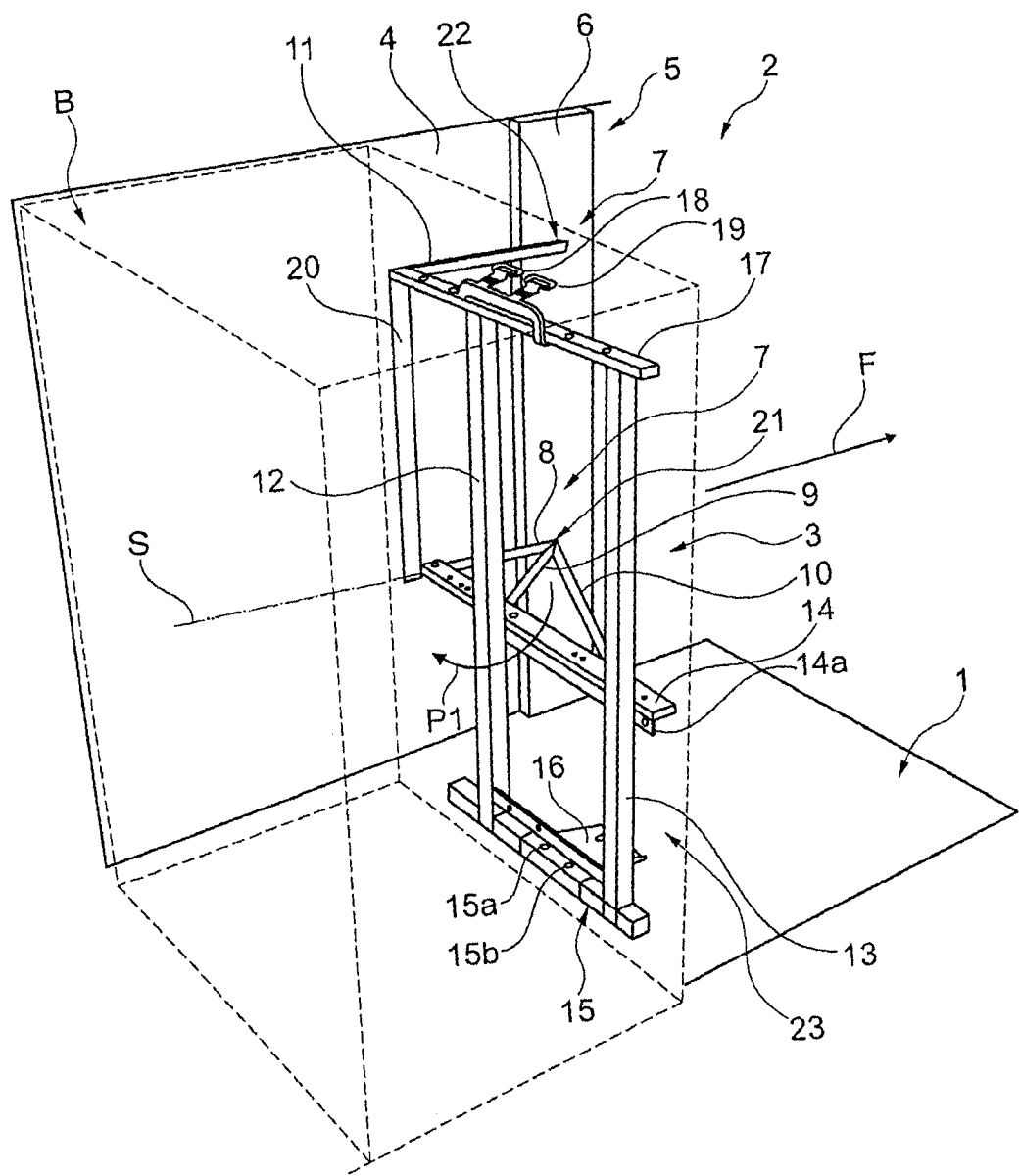

BELT MOUNT FOR A VEHICLE SEAT OR A VEHICLE BENCH SEAT AND VEHICLE SEAT ARRANGEMENT

FIELD OF THE INVENTION

The present invention relates to a belt mount for a vehicle seat or a vehicle bench seat and vehicle seat arrangement.

BACKGROUND OF THE INVENTION

Devices for attaching a passenger restraint system in a means of transport are known. For example, so-called belt mounts or vehicle seat mounts are used for receiving or attaching a safety belt arrangement for passenger safety and consisting of components of an associated passenger seat arrangement in a means of transport.

A vehicle seat or a vehicle bench seat can be provided in a vehicle by means of the vehicle seat mount or the belt mount. An attachment mechanism or a support arrangement for attaching the belt mount to a vehicle structure of the vehicle is present on the belt mount in order to fix at least a lower end section of the belt mount in the region of the vehicle floor.

In means of transport or vehicles, for example, cars, minibuses, recreational vehicles, or camper vans, belt mounts are installed retrospectively as a unit after the vehicle has been manufactured. The belt mount with the passenger restraint system present thereon must be designed for maximum loading situations which occur in the vehicle and which can occur, in particular, in connection with vehicle accident scenarios in traffic.

In addition to technical criteria such as, in particular, safety and stability criteria, with respect to the design of the belt mount, economic aspects also need to be taken into consideration in the manufacture of the belt mount and its installation and use situation.

SUMMARY OF THE INVENTION

The object of the present invention is to provide a device of the type described in the introduction and a passenger seat arrangement for a vehicle which are technically and economically advantageous. It is intended, in particular, that stability criteria can be met in a manner which is advantageous in terms of safety and manufacturing technology, wherein the attachment of the belt mount in the vehicle can be adapted to a predetermined installation situation in the vehicle.

The present invention is based on a belt mount for a vehicle seat or a vehicle bench seat in a vehicle, wherein the belt mount comprises an attachment mechanism for attaching the belt mount to a vehicle structure of the vehicle in the region of a vehicle floor such that, in the attached state of the belt mount, a lower end section of the belt mount can be fixed in the region of the vehicle floor, wherein the belt mount comprises a support arrangement with a support member for supporting the belt mount on the vehicle structure of the vehicle. In addition to being attached to the vehicle floor, by means of the support arrangement, the belt mount can be fastened to further sections of the vehicle or the vehicle bodywork which are resilient to mechanical loads. Support by the support member is accordingly affected in a different region from the vehicle floor or in a region of the vehicle structure which is present above the vehicle floor. The connection to the support struts represents a mechanically rigid connection of the belt mount to the vehicle structure.

The belt mount advantageously comprises a plurality of vertical supports, wherein the vertical supports are oriented vertically in the longitudinal direction. The vertical supports are advantageously present so that they are spaced apart from each other laterally or sideways or horizontally. The belt mount preferably comprises precisely two or precisely three or precisely four similar, preferably identical vertical supports. The vertical supports are preferably in each case an elongated profile and preferably extend continuously from one end of the belt mount to a lower end of the belt mount.

The lower end section of the belt mount can be formed by a lower end of at least one vertical support or all the vertical supports themselves and/or be formed by an angled section of the vertical supports and/or an element which is additionally present on the vertical supports such as an element oriented horizontally or transversely.

For example, a connection of the vertical supports to each other exists in the base region of two or more vertical supports, for example, by means of the element or a cross-strut via which the configuration of the fixing in the floor region of the vehicle or on the vehicle structure can be improved.

A horizontally oriented elongated cross-strut preferably connects the, in particular, parallel vertical supports to each other; preferably at a vertical height at which a sitting surface of the vehicle seat is present on the vehicle seat which can be equipped with the belt mount.

A cross-strut is preferably formed so that it is continuous and preferably projects outward horizontally or laterally on a vertical support or on the plurality of vertical supports.

The belt mount is formed, in particular, as an installation fixture in the manner of a frame-like mount, comprising free spaces which are framed by, in particular, elongated profiles, such as the vertical supports and the cross-strut, which are oriented parallel and at an angle to each other and are connected to each other. The profiles preferably consist of a metal material. The profiles are preferably single or multiple hollow profiles with a, for example, rectangular or round or oval cross-section.

The belt frame proposed must have a structural or mechanical design such that it can counter a maximum or possible load, in particular, in the case of dynamic loading events, with a sufficient resistance, in other words can absorb and transmit corresponding forces and torques.

The belt mount is accordingly designed so as to form an inner carrying structure of a passenger seat installed rigidly in the vehicle.

The core of the present invention consists in the fact that, with respect to the attached state of the belt mount in the vehicle, viewed in a vertical direction, the support member is present on the belt mount such that it is spaced apart at the top from the lower end section of the belt mount, and wherein the support member on the belt mount protrudes forward in the driving direction of the vehicle, and the support member is formed in such a way that the support member can be connected in the region of the vehicle structure of the vehicle which is present above the vehicle floor. The driving direction means the forward direction. The connection is preferably effected at points on the vehicle or bodywork structure which are selected or may be prepepared on the vehicle and are resilient to high loads.

The anchoring of the belt mount in the vehicle can thus be configured in a particularly stable and variable fashion. In particular, with the support member which, for example, projects forward on the belt mount, a large number of regions on the vehicle which exist above the vehicle floor can be used for anchoring. These can be, for example, sides of inner and/or outer walls of the vehicle or the vehicle bodywork or, for example, a bodywork frame or a supporting pillar of the vehicle bodywork.

The support member is preferably not in connecting contact with the floor in the vehicle.

The protruding of the support member forward means that a seat direction, provided with the belt mount, is associated with a front side of the belt mount, with respect to a vehicle seat which can be produced with the belt mount. The belt mount is installed in such a way that the seat direction coincides with the driving direction of the relevant vehicle and the front side of the belt mount is directed in the driving direction of the vehicle. When the vehicle seat is formed, the sitting surface protrudes forward on the front side of the belt mount.

The support member advantageously provides an attachment mechanism on the belt mount in order to be able to fix the belt mount on the vehicle structure even better. The support member is preferably present above a height of the belt mount at which a sitting surface of the vehicle seat which can be formed with the belt mount exists and/or at a vertical height on the upper end of the installed belt mount.

The support member is designed in such a way that, by means of the support member, an undetachable or preferably a detachable connection to the vehicle structure above the vehicle floor is possible. The support member can, for example, be fastened above the vehicle floor by welding and/or screws.

The belt mount can advantageously hence be fixed to a further structure, in particular, a vehicle structure of the vehicle which is resilient to high mechanical loads, in addition to the floor anchoring. The support member is formed so as to make a flat and/or spot or linear connection to the vehicle structure.

A passenger restraint system is advantageously formed as a safety belt arrangement, for example, as a multi-point belt safety system such as a three-point safety system. A component of the passenger restraint system can preferably be attached to the belt mount. Such a component is present, for example, as a belt retractor, a belt deflection arrangement for changing the direction of the belt which passes over it, a fixing means for a belt end, or as a belt buckle on which an insertion part can be engaged detachably and by means of which the belt can be pulled out as a loop.

In the case of a typical belt mount according to the present invention in the installed state with, for example, two or three vertical supports which stand upright in the vehicle and a horizontally oriented cross-strut, the length of the vertical supports or the height of the belt mount is approximately 1.1 meters to approximately 1.3 meters when mounted, wherein the vertical supports, in particular, the two outer vertical supports, are present such that they are spaced apart laterally from each other by a distance of, for example, approximately 0.3 to 0.4 meters. The length of the cross-strut is preferably 0.7 to 0.9 meters.

A typical dimension for the length and/or width or side of the cross-section of the hollow profile is approximately 20 to 40 millimeters. The wall thickness of the hollow profile is generally within a range of less than 10 millimeters. It is also conceivable that the hollow profile is present as a multiple hollow profile.

The support member is advantageously formed as an essentially rigid component. Hence, when a load is applied as in an accident scenario of the vehicle, the belt mount and the vehicle seat arrangement are stabilized against critical deformation. This contributes to the safety of the passenger sitting on the vehicle seat and secured by the belt system. The support member preferably consists of a metal or steel material. The support member is preferably fixed on a vehicle structure present laterally next to the belt mount. A connection or fastening point of the vehicle structure is preferably present which is offset forward in the driving direction with respect to the vertical supports by a significant distance, in particular, by a distance from the vertical supports of a magnitude corresponding to the depth of the vehicle seat or sitting surface.

It is furthermore advantageous if, with respect to the attached state of the belt mount in the vehicle, the support arrangement comprises a support member which is oriented horizontally or slightly inclined to the horizontal. A stable connection and support of the belt mount in the direction of the main loading or horizontally is thus achieved. The support arrangement or the support member is preferably present in the region of a sitting surface of the vehicle seat which can be provided with the belt mount.

Another advantage is that the support member is formed as an elongated profile element. This saves material and space. The support member preferably consists of a flat material or an angled profile or a rectangular or tubular or round hollow profile.

It is moreover advantageous that the support arrangement comprises a support member oriented in the driving direction, preferably a support member oriented parallel to the driving direction. The longitudinal axis of the support member is preferably oriented parallel to the driving direction or longitudinal axis of the vehicle. The support member preferably stands at right angles or inclined with respect to the cross-strut or the widthwise axis of the belt mount.

The support arrangement advantageously comprises a support member oriented so that it is inclined with respect to the driving direction. Forces and torques can thus be absorbed even better and deformations under loading minimized. An inclined support member enables extended support of the belt mount at different points of the belt mount. The belt mount preferably comprises a support member oriented parallel to the driving direction and at least one support member oriented so that it is inclined with respect to the driving direction. The support members can preferably lie in a horizontal plane and form two sides of a triangle. The third side of the triangle can be formed, for example, by the cross-strut of the belt mount.

In the case of multiple support members, multiple or all the support members are preferably formed as similar profiles, for example, as a rigid elongated profile. The support member with an inclined orientation can be connected directly to the vehicle structure at one end or fastened thereto and/or can be in rigid contact with a further support member, wherein the further support member is fastened on the vehicle structure.

It is moreover advantageous that the support member extends on the belt mount such that it protrudes forward over a support length of the support arrangement. Forward means that the support member extends in the direction of a driving direction of the vehicle, relative to the installed belt mount. The support length in the driving direction is preferably at least essentially the depth of a sitting surface of the vehicle seat arrangement which can be formed with the belt mount. The support member is thus present in a space-saving manner without restricting the freedom of movement of the person who is sitting down. Moreover, the support member can thus be connected to a retaining point of the vehicle structure which is spaced apart from the vertical supports to the front.

The support arrangement preferably comprises a flat support member. The support member is preferably a panel-like rigid element. This represents a component with a compact structure which is highly stable to deformation, in particular, when oriented upright in the longitudinal direction. The flat support member can additionally advantageously be connected, for example, to an inner side of a vehicle wall or a supporting vehicle column.

It is furthermore advantageous that the support arrangement can be adjusted on the belt mount. Owing to the adjustability, the support arrangement can be moved from an active supporting position on the belt mount to an inactive position of the support member, and vice versa. The adjustability is, for example, advantageous when, if the seat is unoccupied, it is desired to access from above storage space below the sitting surface of the seat which can be provided with the belt mount.

The support arrangement or the at least one support member can thus be moved out of an active or use position, for example, folded, pivoted, or pushed away. Alternatively, the support arrangement can also reversibly be removed completely from the belt mount or the vehicle structure.

For this purpose, the support members are accommodated on a complementary section on the belt mount and/or the vehicle structure such that they can be screwed in place, locked in place and/or telescoped via a hinge arrangement or a slide arrangement.

The at least one support member is, for example, accommodated so that it can be pivoted about a horizontal and/or vertical and/or inclined axis of pivoting.

The adjustability of the support member is configured such that, in the use position of the support member, inadvertent or undesired adjustment is reliably prevented, for example, by means of a safety arrangement.

The present invention also extends to a vehicle seat arrangement such as a vehicle seat or a vehicle bench seat with a belt mount according to one of the abovementioned embodiments. The vehicle seat arrangement which can be formed with the belt mount, for example, an individual vehicle seat or a vehicle bench seat accordingly has, in addition to the passenger restraint system, a seat cushion structure with a sitting surface which is situated on the front side of the belt mount or the front side of the vertical support or the front side of the cross-strut. The front side of the belt mount is oriented in the driving direction in the installed state in the vehicle.

In the installed state of the belt mount in the vehicle, the relevant direction of loading generally corresponds to a seated direction of the person secured or the driving direction of the vehicle. A maximum load is applied to a vehicle when the relevant vehicle impacts an obstacle. Owing to the braked mass of the person sitting and secured in the vehicle, a jerking tensile force or a torque resulting therefrom acts on the belt mount via the safety belts of the passenger restraint system in the direction of loading or in the driving direction F. These possible loads need to be taken into consideration in the support arrangement, which is advantageously possible with the proposed support arrangement.

Lastly, a subject of the present invention is a vehicle with a vehicle seat arrangement according to the abovementioned embodiment. The vehicle is, for example, a car, minibus, recreational vehicle, or camper van.

BRIEF DESCRIPTION OF THE DRAWINGS

Further features and advantages of the present invention are explained with the aid of an exemplary embodiment of the present invention which is illustrated in a highly schematic fashion.

The single FIG. 1 here shows a portion of the interior of a vehicle with a belt mount 3 according to the present invention housed therein in a perspective view of the belt mount 3 obliquely from behind.

DETAILED DESCRIPTION OF THE INVENTION

In FIG. 1, the belt mount 3 according to the present invention is securely housed above a vehicle floor 1 in an inner region 2 of the vehicle. The belt mount 3 is securely anchored on the vehicle floor 1 by its lower end section, wherein the belt mount 3 shown serves to provide a vehicle two-person bench seat, the components of which such as cushion and upholstery elements and parts of a passenger restraint system can be attached to the belt mount 3. The belt mount 3 is oriented with its front edge in the driving direction F of the vehicle. The seating direction of the two-person bench seat of the vehicle which can be provided with the belt mount 3 coincides with the driving direction F.

In the driving direction F, a flat plane vehicle wall 4, which is oriented perpendicular to the plane spanned by the vehicle floor 1, adjoins the belt mount 3 on the left.

A schematically shown reinforcing structure 5 of the vehicle is present on the inside of the vehicle wall 4 and forms a vehicle section in the vehicle which is resilient to mechanical loads, such as, for example, a supporting vehicle column 6 which connects a roof region of the vehicle (not shown) to a bodywork substructure comprising the vehicle floor 1.

The reinforcing structure 5 is relatively stable statically and dynamically and can advantageously be used to support and anchor the belt mount 3 with a support arrangement 7 of the belt mount 3. The support arrangement 7 provides additional fixing or support of the belt mount 3 above the vehicle floor 1 and hence of the two-person bench seat which can be formed therewith in the vehicle or on the vehicle reinforcing structure 5. In the example shown of the belt mount 3 according to the present invention, the support arrangement 7 comprises multiple support members which are formed as three central (when viewed vertically) support struts 8, 9, and 10 and one vertically upper support strut 11.

A cuboid region B behind the belt mount 3 which is shown in a slightly schematic fashion and bordered in dashed lines represents a modified region which comprises, for example, wall elements of a vehicle cabinet in the interior of the vehicle or elements of internal equipment of the vehicle. By virtue of the region B, which is less resilient to mechanical loads, the belt mount 3 cannot be supported from behind or to the rear with respect to the belt mount 3 in a sufficiently stable and practical manner.

The support arrangement 7 is therefore provided with the support struts 8 to 11 which protrude forward from the belt mount 3 and extend forward in the driving direction F.

Other or further support struts are also possible on the belt mount 3, in particular for the purpose of connection to the reinforcing structure 5 or the vehicle column 6. Further support struts can accordingly be present, for example, at the height of the upper support strut 11 or also inclined with respect to the horizontal, for example, support struts oriented in accordance with the support struts 9 and 10 and offset vertically upward with respect to the support struts 9 and 10.

There can also be precisely one of the support struts 8, 9, 10, or 11 shown present on the belt mount 3, which serves to support the belt mount 3 on the vehicle structure and provides sufficiently stable support. Precisely two or three of the in total four support struts 8 to 11 can advantageously also be present on the belt mount 3 for support on the vehicle structure 5. The precisely two or precisely three support struts 8 to 11 can be any of the four support struts 8 to 11, for example, the support struts 8 and 11, the support struts 9 and 11, the support struts 10 and 11, support struts 8 and 10, support struts 9 and 10, or, for example, the support struts 8, 10 and 11.

By virtue of the support struts 9 and 10 which are in contact with the cross-strut 14 over its length at two spaced-apart points at a distance from the vehicle column 6, the cross-strut 14 is advantageously reinforced over its length, and hence the belt mount 3 too, which is advantageous when a load is applied.

The belt mount 3 is constructed as a frame structure consisting of multiple interconnected profiles, for example square hollow profiles. The belt mount 3 comprises two vertical supports 12 and 13, oriented parallel with each other and aligned with each other, the cross-strut 14 which is attached to the front of the vertical supports 12 and 13 at approximately half their height vertically, and a base strut 15, parallel to the cross-strut 14, at the lower end of the vertical supports 12, 13. The cross-strut 14 is fastened to the vertical supports via an elongated angled element 14*a*. The base strut 15 interconnects the vertical supports 12 and 13 and comprises a flat baseplate 16, extending forward or in the driving direction F, which is connected, for example, screwed, to the surface of the vehicle floor 1, bearing thereon. The base strut furthermore has two screw holes 15*a* and 15*b* through which extend, for example, screw means for rigid anchoring to the floor or screwing to the vehicle floor 1.

At their upper end, the vertical supports 12 and 13 are stabilized by a further cross-element 17 to which, on both sides with respect to the longitudinal center of the cross-element 17, belt eyelets 18, 19 of the safety belt passenger restraint system (otherwise not shown), for example, of two three-point safety belt arrangements, are attached.

The respective outer ends, facing the vehicle wall 4, of the cross-strut 14 and the cross-element 17 are connected to a flat bar 20 extending upright.

Each of the support struts 8 to 11 is connected rigidly on one hand by one end region to the belt mount 3 and on the other hand is connected, for example, screwed, by the other end region in a stable or rigid fashion directly or indirectly via the support strut 8 rigidly to the vehicle structure 5 or the vehicle column 6, which in the case of the support struts 8, 9, and 10 is configured via at least one static retaining point 21 on the vehicle or on the vehicle column 6, and in the case of the upper support strut 11 is configured via a further static retaining point 22 of the vehicle on the vehicle column 6.

Multiple retaining points can in principle be configured both on the support strut 8, 9, or 10 for connection to the vehicle column 6 and multiple static retaining points can be configured, for example, with multiple screwed connections between the upper support strut 11 and the vehicle column 6.

The support struts 8 to 11 can be connected to the vehicle column 6 by being screwed, welded, adhesively bonded, and/or in another fashion.

All or individual support struts of the support struts 8-11 can preferably be adjusted, for example, can be pivoted away from the horizontal orientation in the use state, as shown, into a vertical orientation (not shown) or can also be removed from the belt mount 3 and/or the vehicle wall 6.

The shared ability of the interconnected support struts 8, 9, and 10 to be pivoted in the direction of pivoting P1 about a horizontal axis of pivoting S in indicated in FIG. 1. The support struts 9 and 10 can hence be folded back immediately next to the inside of the vehicle wall 4. For this purpose, the support struts 9 and 10 must be connected to the cross-strut 14 in a detachable, for example, latchable fashion.

A user can thus access from above, for example, a storage space 23 which is present below a sitting surface of the vehicle bench seat which can be formed with the belt mount 3.

LIST OF REFERENCE NUMERALS 1 vehicle floor
2 inner region
3 belt mount
4 vehicle wall
5 reinforcing structure
6 vehicle column
7 support arrangement
8 support strut
9 support strut
10 support strut
11 support strut
12 vertical support
13 vertical support
14 cross-strut
14*a* angled element
15 base strut
15*a* screw hole
15*b* screw hole
16 baseplate
17 cross-element
18 belt eyelet
19 belt eyelet
20 flat bar
21 retaining point
22 retaining point
23 storage space

The invention claimed is:

1. A belt mount for a vehicle seat or a vehicle bench seat in a vehicle, wherein the belt mount comprising:
   an attachment mechanism for attaching the belt mount to a vehicle structure of the vehicle in a region of a vehicle floor such that, in an attached state of the belt mount, a lower end section of the belt mount can be fixed in the region of the vehicle floor; and
   a support arrangement with at least one support member supporting the belt mount on the vehicle structure of the vehicle,
   wherein, in the attached state of the belt mount, when viewed in a vertical direction, the at least one support member is present on the belt mount and spaced apart at the top from the lower end section of the belt mount,
   wherein the at least one support member on the belt mount protrudes forward in a driving direction of the vehicle,
   wherein the at least one support member is connected in a region of the vehicle structure of the vehicle located above the region of the vehicle floor, and wherein a flat one of the at least one support member of the support arrangement is connectable with sides of an inner wall of the vehicle, a supporting pillar of a vehicle bodywork, or a supporting vehicle column.

2. The belt mount as claimed in claim 1, wherein at least one of the at least one support member is a rigid component.

3. The belt mount as claimed in claim 1, wherein, in the attached state of the belt mount in the vehicle, in the support arrangement, at least one of the at least one support member is oriented horizontally or inclined with respect to the horizontal direction.

4. The belt mount as claimed in claim 1, wherein the at least one support member is an elongated profile element.

5. The belt mount as claimed in claim 1, wherein in the support arrangement, at least one of the at least one support member is oriented in the driving direction.

6. The belt mount as claimed in claim 1, wherein in the support arrangement, at least one of the at least one support member is inclined with respect to the driving direction.

7. The belt mount as claimed in claim 1, wherein the at least one support member extends on the belt mount and protrudes forward in the driving direction over a support length of the support arrangement.

8. The belt mount as claimed in claim 1, wherein the at least one support member is flat.

9. The belt mount as claimed in claim 1, wherein the at least one support arrangement is adjustable on the belt mount.

10. A vehicle seat comprising the belt mount as claimed in claim 1.

11. A vehicle comprising the vehicle seat as claimed in claim 10.

12. The belt mount as claimed in claim 1, wherein in the support arrangement, at least one of the at least one support member is oriented parallel to the driving direction.

* * * * *